Patented Feb. 28, 1939

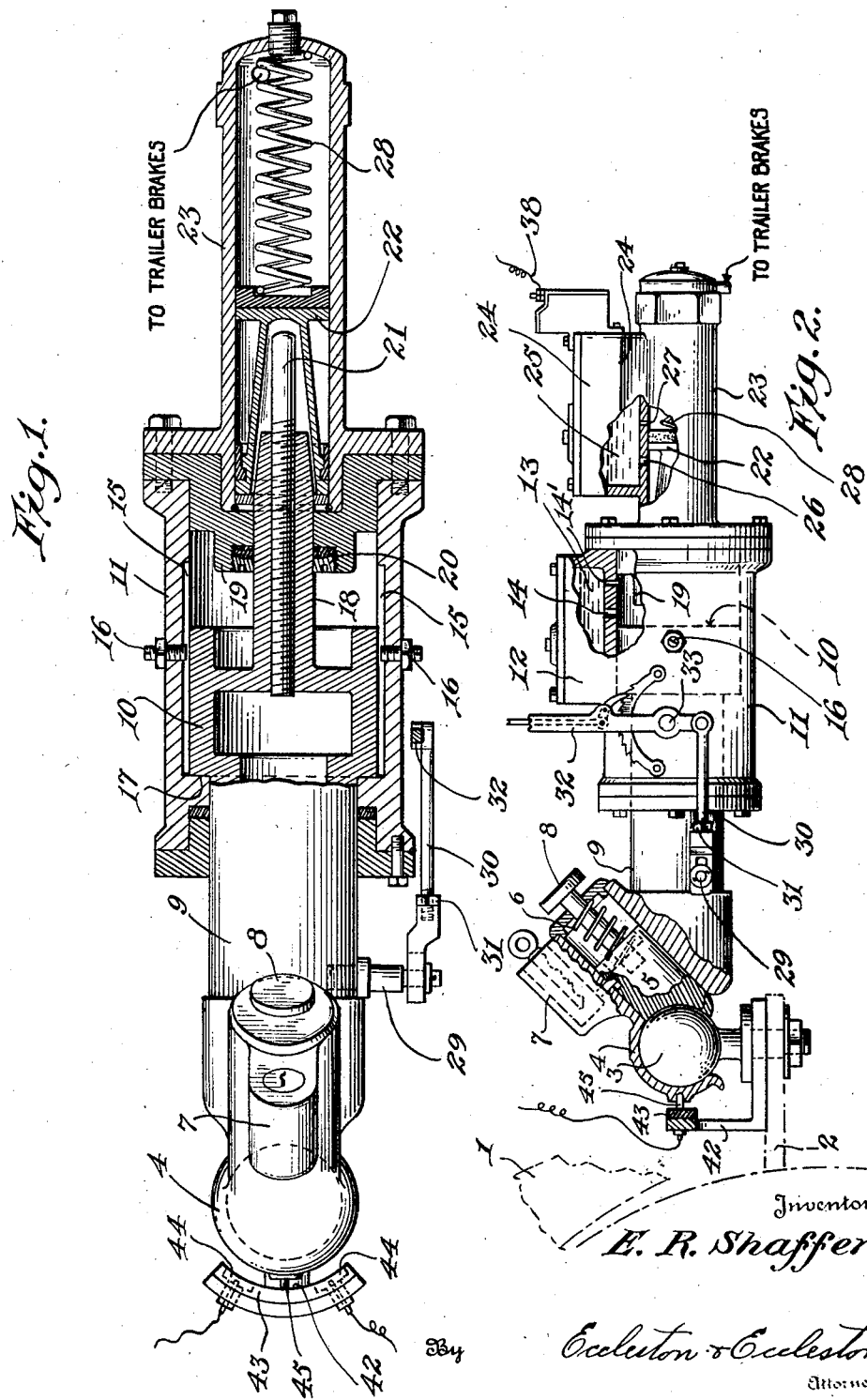

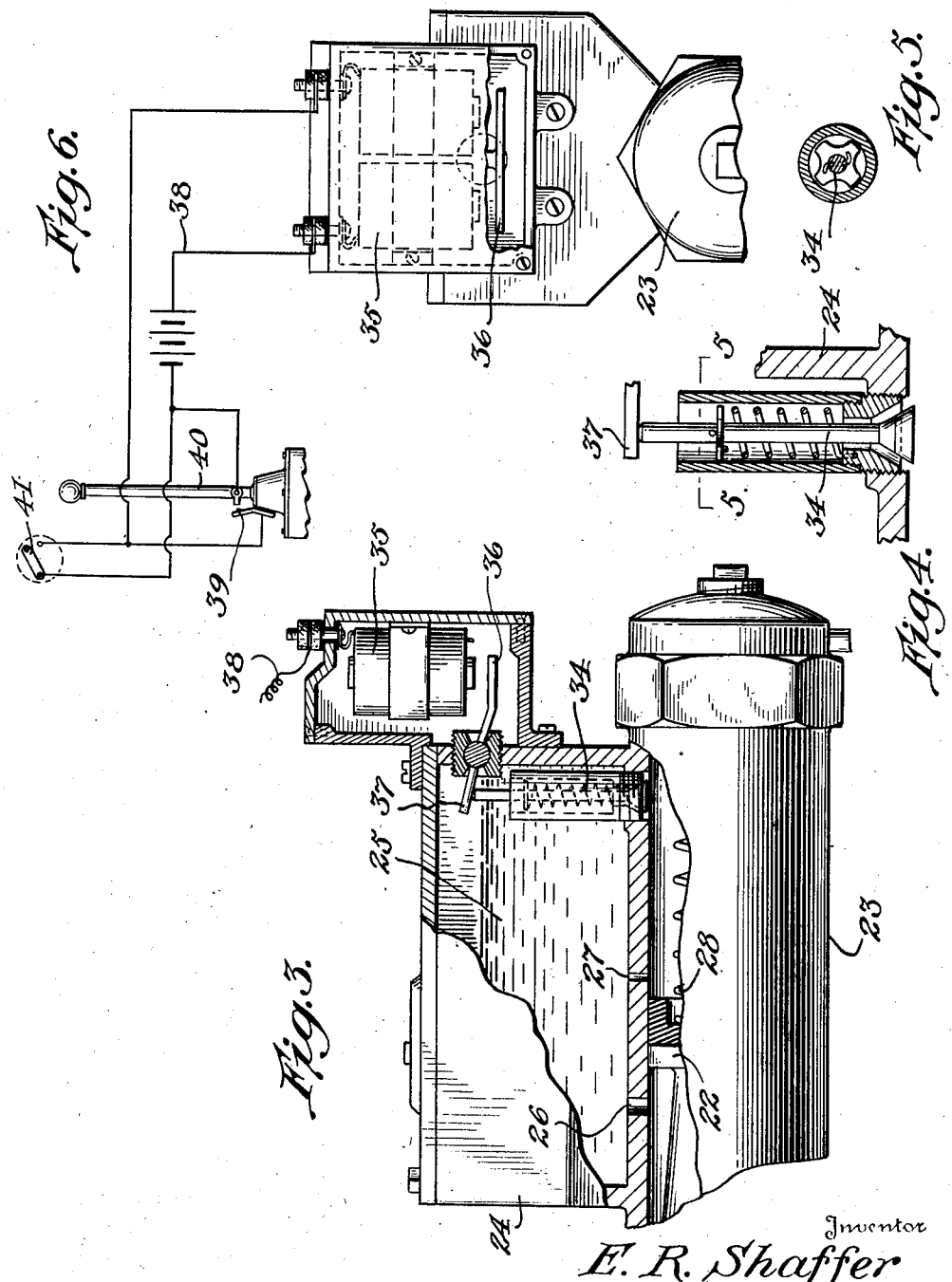

2,149,189

UNITED STATES PATENT OFFICE 2,149,189

TRAILER COUPLING AND AUTOMATIC BRAKE MECHANISM

Elgie R. Shaffer, Columbus, Ohio

Application February 5, 1937, Serial No. 124,291

9 Claims. (Cl. 188—112)

The present invention relates to vehicle trains and especially to those of the type consisting of an automobile and trailer, and consists of certain improvements on the construction disclosed in my copending application Serial No. 104,276, filed October 6, 1936.

One of the objects of the invention resides in the incorporation of a cylinder and piston in the draft appliance, the construction being such that the fluid may pass from one end of the cylinder to the other but at a regulated rate in accordance with certain adjustments, thereby providing a shock-absorber adaptable to varying loads.

A further object of the invention consists in the provision of a connection between the draft appliance and the brake mechanism of the trailer whereby over-running of the latter will cause an automatic application of the brakes.

Another object of the invention consists in providing mechanism for hand operation of the trailer brakes even in the absence of fluid in the cylinder, such mechanism being adjustable for varying loads.

Another object of the invention consists in the provision of means, set in operation either automatically or by hand, to render the brake mechanism inoperative when the vehicle is backing.

A further object of the invention resides in the provision of a lock on the coupling to prevent unauthorized detachment of the trailer from the leading vehicle.

Another object of the invention resides in the provision of a simplified signalling apparatus to automatically indicate at the rear of the trailer either right or left turns of the leading vehicle.

Other objects and advantages of the invention will be apparent from the following description when taken in connection with the accompanying drawings, in which, Figure 1 is a plan view of the apparatus, parts being broken away and parts being shown in section.

Figure 2 is a side elevational view, parts being broken away, and parts being indicated in dotted outline.

Figure 3 is an enlarged detail view, partly in section, of the means for rendering the brake inoperative.

Figure 4 is an enlarged detail view of a valve in the system.

Figure 5 is a horizontal sectional view taken on line 5—5 of Figure 4; and

Figure 6 is a detail view indicating the wiring diagram.

Referring to the drawings in more detail the numeral 1 indicates a portion of a leading vehicle, such as an automobile, and the numeral 2 indicates a rearwardly extending bar to which is attached a ball 3 forming one element of a coupling for the trailer (not shown).

The numeral 4 indicates a socket member which is adapted to releasably engage over the ball 3, and the numeral 5 indicates a plunger mounted on the socket member and adapted to hold the parts in operative relation. A spring 6 forces the plunger against ball 3 and a lock 7 is provided for holding the plunger in this position until released by the proper key. A rod 8 is provided for manually disengaging the plunger from the ball after the lock is operated.

The parts just described are mounted on the forward end of a draft bar 9, and on the rear end of this bar is a piston 10 which is slidably mounted in a cylinder 11. Associated with the cylinder 11 is a tank 12 mounted on the upper side thereof (Fig. 2). This tank is charged with oil or other fluid 13 and is in communication with the cylinder 11, through the medium of passages 14—14' when the piston 10 is in its forward position.

Formed on the inner wall of the cylinder 11 is a pair of longitudinal grooves or channels 15 to provide for passage of fluid back and forth from one end of the cylinder to the other, and these channels are provided with screws or valves 16 by means of which the rate of flow through the channels may be regulated as will appear hereinafter.

The forward end of the piston 10 is adapted to engage an annular shoulder 17 in the ordinary operation of the device. The rear end of the piston is provided with a tubular extension 18 slidably mounted in a bearing 19 provided with a packing gland 20. In this tubular member is threaded a rod 21 adapted to operate a brake operating piston 22 in a cylinder 23 which is connected to the main cylinder 11.

Cylinder 23 is provided with a supply tank 24 for oil or other fluid 25, and passages 26 and 27 permit communication between the cylinder and tank. This piston 22 is normally biased to the left by means of a spring 28 which maintains the trailer brakes in released position. Movement of the rod 21 to the right imparts a similar movement to piston 22 and thus sets the brake-operating mechanism in operation. By adjustment of the rod 21 it will be apparent that greater movement of piston 10 may be required before the brake mechanism is set in operation thereby adapting the apparatus to varying load requirements.

In order to apply the trailer brakes by hand an abutment 29 is provided on draft bar 9 and to this abutment is attached a rod 30 provided with an adjustment 31. A hand lever 32 is pivoted to the side of cylinder 11 as indicated by numeral 33 and is pivotally connected at its lower end to rod 30. By operating lever 32 the piston 10 may be moved to the right (Figure 1) thereby causing operation of piston 22 and thus an application of the brakes on the trailer. The hand operation of the brakes together with the adjustment 31 also provides a ready means for adjusting the brakes to varying loads.

It is essential to avoid automatic application of the brakes when the vehicle is backing, and for this purpose a spring-pressed valve 34 is provided at the rear end of tank 24. This valve opens into the rear end of cylinder 23 and functions to allow the escape of the brake-operating fluid 25 into tank 24 when the valve 34 is open. The valve may be opened automatically or by hand, and to this end an electromagnet 35 is provided. This electromagnet includes an armature 36 having an extension 37 adapted to open the valve when the electric circuit 38 is closed. The circuit includes a switch 39 for cooperation with the gear-shift lever 40, and a manually-operated switch 41 which may be mounted on the dash or at any other convenient point. When the gear-shift lever is moved into "reverse" the switch 39 is closed and the valve 34 is automatically opened, thereby allowing fluid to escape into the tank 24 and thus avoid applying the brakes to the trailer. The brakes will also be rendered inoperative of course if the manually-operated switch 41 is closed, regardless of the position of the gear-shift lever.

For the purpose of giving automatic right and left-turn signals at the rear of the trailer a bracket 42 is mounted on the bar 2 of the leading vehicle 1 and this bracket is provided with a block of insulation material 43 in which are mounted two contacts 44. The forward exterior surface of the socket member 4 carries a brush 45 which will engage either the one or the other of the contacts 44 when the leading vehicle moves to either the right or the left and it will be understood that these contacts form parts of circuits including lamps at the rear of the trailer to indicate right or left-turns.

The operation of the locking mechanism for the coupling is believed to be obvious without further description. As to the brake operation and shock-absorbing features of the apparatus however certain details should be emphasized. As the trailer overruns the leading vehicle, as when descending a hill there will be a relative movement between the cylinder 11 and piston 10 thus causing the piston to have an apparent movement to the right (Figure 1). This movement of the piston causes the rod 21 to engage piston 22 and thus initiate the application of the brakes to the trailer. Further movement of the piston 10 closes the port 14 thereby partly shutting off the tank 12. Any additional movement of piston 10 to the right is permitted only as the fluid trapped in the right-hand end of the cylinder escapes through the small port 14′ to tank 12 and through the channels 15 and past the adjustable screws 16. It will be obvious therefore that the brakes will be applied more or less gradually in accordance with the adjustment of screws 16, and that such adjustments are to be made in accordance with the load on the trailer.

It is also to be noted that the channels 15 provide for the return of fluid from the front to the rear end of the cylinder thus providing an excellent shock-absorber between the two vehicles.

If, for any reason, it is desired to avoid application of the brakes on the trailer, the valve 34 is opened by manually closing the switch 41 or by placing the gear-shift lever in reverse, thereby rendering the brake-operating fluid inoperative as heretofore described.

From the foregoing description and the accompanying drawings it will be apparent to those skilled in the art that I have devised a draft appliance including a hydraulic shock-absorber between the two vehicles; that automatic means are provided for applying the brakes on the trailer; that such means is independent of fluid pressure in the shock-absorbing structure; that simple adjustments are provided for varying the operation of the brakes as well as the shock-absorber in accordance with the load on the trailer; that hand operation of the brakes is provided; that the brake-operating mechanism is easily rendered inoperative when desired; that automatic direction signals form a part of the mechanism; and that the coupling is so designed and constructed as to prevent surreptitious detachment of the trailer.

In accordance with the patent statutes I have described what I now believe to be the preferred embodiment of the invention, but inasmuch as various minor changes may be made in the details of construction without departing from the spirit of the invention it is intended that all such changes be included within the scope of the appended claims.

What I claim is:

1. A combined coupling and brake-operating mechanism for a vehicle train, including a cylinder and piston in the coupling, a fluid brake-operating cylinder and piston, means for imparting movement from the first piston to the second piston, and means for permitting the escape of fluid from the second cylinder under certain conditions when operated by the first-mentioned piston.

2. A combined coupling and brake-operating mechanism for a vehicle train, including a cylinder and piston in the coupling, a fluid brake-operating cylinder and piston, means on the first piston for engaging and operating the second piston, and an electrically-operated valve for permitting the escape of fluid from the second cylinder when the circuit is closed.

3. A combined coupling and brake-operating mechanism for a vehicle train, including a gear-shift lever, a cylinder and piston in the coupling, a fluid brake-operating cylinder and piston, means on the first piston for engaging and operating the second piston, an electrically-operated valve for permitting the escape of fluid from the second cylinder, and a switch in the circuit, said switch being so positioned as to be closed when the gear-shift lever is moved to "reverse".

4. A combined coupling and brake-operating mechanism for a vehicle train, including a shock-absorbing cylinder and a brake-operating cylinder rigidly connected end-to-end, a piston for each of the cylinders, a draw bar connected to the piston of the shock-absorbing cylinder, means for permitting a circulation of fluid around said piston, brake-operating means associated with the piston of the brake-operating cylinder, and a lost-motion connection between the two pistons.

5. A combined coupling and brake-operating mechanism for a vehicle train, including a shock-absorbing cylinder and a brake-operating cylinder rigidly connected end-to-end, a piston for each of the cylinders, a draw bar connected to the piston of the shock-absorbing cylinder, means for permitting a circulation of fluid about said piston, brake-operating means associated with the brake-operating cylinder, and a rod on the shock-absorbing piston for engaging and operating the brake-operating piston.

6. A combined coupling and brake-operating mechanism for a vehicle train, including a shock-absorbing cylinder and a brake-operating cylinder rigidly connected end-to-end, a piston for each of the cylinders, a draw bar connected to the piston of the shock-absorbing cylinder, means for permitting a circulation of fluid about said piston, brake-operating means associated with the brake-operating cylinder, and a rod adjustably connected to the shock-absorbing piston for engaging and operating the brake-operating piston.

7. A combined coupling and brake-operating mechanism for a vehicle train, including a shock-absorbing cylinder and brake-operating cylinder rigidly connected end-to-end, means for providing a shock-absorbing action in the first-mentioned cylinder and brake-operating action in the other cylinder when the vehicles are caused to approach each other, and means for automatically releasing the brake-operating action in the brake cylinder and providing shock-absorbing action in the first-mentioned cylinder when the vehicles move relatively apart.

8. A combined coupling and brake-operating mechanism for a vehicle train, including a cylinder and piston in the coupling, a fluid brake-operating cylinder and piston, means on the first piston for engaging and operating the second piston in one direction, a spring for operating the second piston in the opposite direction, and means for rendering movement of the second piston ineffective to apply the brakes when operated by the first piston.

9. A combined coupling and brake-operating mechanism for a vehicle train, including a cylinder and piston in the coupling, a fluid brake-operating cylinder and piston, means for imparting movement from the first piston to the second piston, and means for rendering movement of the second piston ineffective to apply the brakes when operated by the first piston.

ELGIE R. SHAFFER.